US012191617B2

(12) United States Patent
Berghahn et al.

(10) Patent No.: US 12,191,617 B2
(45) Date of Patent: Jan. 7, 2025

(54) CONNECTION DEVICE FOR A SHIELD CONDUCTOR OF AN ELECTRICAL LINE

(71) Applicant: Phoenix Contact GmbH & Co. KG, Blomberg (DE)

(72) Inventors: Kevin Berghahn, Blomberg (DE); Heinz Reibke, Bad Salzuflen (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 202 days.

(21) Appl. No.: 17/783,282

(22) PCT Filed: Dec. 3, 2020

(86) PCT No.: PCT/EP2020/084382
§ 371 (c)(1),
(2) Date: Jun. 8, 2022

(87) PCT Pub. No.: WO2021/115902
PCT Pub. Date: Jun. 17, 2021

(65) Prior Publication Data

US 2023/0021773 A1 Jan. 26, 2023

(30) Foreign Application Priority Data

Dec. 9, 2019 (DE) .................... 10 2019 133 530.2

(51) Int. Cl.
*H01R 4/48* (2006.01)
*H01R 4/64* (2006.01)
*H01R 11/05* (2006.01)

(52) U.S. Cl.
CPC ............ *H01R 4/489* (2013.01); *H01R 4/484* (2023.08); *H01R 4/646* (2013.01); *H01R 11/05* (2013.01); *H01R 4/4821* (2023.08); *H01R 4/483* (2023.08)

(58) Field of Classification Search
CPC .. H01R 4/48365; H01R 9/0527; H01R 4/489; H01R 11/05; H01R 4/646; H01R 13/639
See application file for complete search history.

(56) References Cited

U.S. PATENT DOCUMENTS 5,934,818 A 8/1999 Schmitt et al.
5,944,566 A 8/1999 Gossmann
(Continued)

FOREIGN PATENT DOCUMENTS

DE 19716762 A1 10/1998
DE 20004019 U1 * 6/2001 .......... H01R 4/4872
(Continued)

*Primary Examiner* — Renee S Luebke
*Assistant Examiner* — Paul D Baillargeon
(74) *Attorney, Agent, or Firm* — LEYDIG, VOIT & MAYER, LTD.

(57) ABSTRACT

A connection device for a shield conductor of an electrical line includes: a housing attachable to a potential collector, into which housing the electrical line with the shield conductor is insertable; a spring element which is arranged adjustably on the housing, which spring element has a clamping leg and is movable relative to the housing from an open position into a clamping position in order to, in the clamping position, act with the clamping leg on the shield conductor of the electrical line inserted in the housing; and a locking element which is adjustable, relative to the housing, between a locking position, in which the housing attached to the potential collector is locked with the potential collector, and an unlocking position for releasing the housing from the potential collector.

17 Claims, 6 Drawing Sheets

(56) References Cited

U.S. PATENT DOCUMENTS

| | | | | |
|---|---|---|---|---|
| 11,128,064 | B2 * | 9/2021 | Berghahn | H01R 13/2464 |
| 2020/0313315 | A1 | 10/2020 | Andresen | |

FOREIGN PATENT DOCUMENTS

| | | | | |
|---|---|---|---|---|
| DE | 20205803 | U1 | 7/2002 | |
| DE | 102013107292 | A1 | 1/2015 | |
| DE | 202015102037 | U1 | 5/2015 | |
| DE | 102015110868 | A1 * | 1/2017 | H01R 25/14 |
| DE | 102016110393 | A1 | 12/2017 | |
| EP | 0834959 | A2 | 4/1998 | |
| EP | 3136519 | A1 | 3/2017 | |
| WO | WO-2019192842 | A1 * | 10/2019 | H01R 13/2464 |

* cited by examiner

CONNECTION DEVICE FOR A SHIELD CONDUCTOR OF AN ELECTRICAL LINE

CROSS-REFERENCE TO PRIOR APPLICATIONS

This application is a U.S. National Phase application under 35 U.S.C. § 371 of International Application No. PCT/EP2020/084382, filed on Dec. 3, 2020, and claims benefit to German Patent Application No. DE 10 2019 133 530.2, filed on Dec. 9, 2019. The International Application was published in German on Jun. 17, 2021 as WO/2021/115902 under PCT Article 21(2).

FIELD

The invention relates to a connection device for connecting a shield conductor of an electrical line to a potential collector.

BACKGROUND

Such a connection device comprises a housing which can be attached to a potential collector, into which housing an electrical line with a shield conductor can be inserted. Furthermore, such a connection device comprises a spring element, arranged so as to be adjustable on the housing, that has a clamping leg and is movable relative to the housing, from an open position into a clamping position, in order to, in the clamping position, act by means of the clamping leg on the shield conductor of the electrical line inserted into the housing.

Such a connection device, also referred to as a shield clamp, serves to contact a shield conductor over a large area with a potential collector—for example a busbar, a support rail, or a housing wall of an electrical installation (for example a switch cabinet). The contacting should hereby be resistant, especially temperature-resistant and corrosion-resistant (even in an aggressive environment) and vibration-resistant, in order to produce a reliable potential shielding of the shield conductor over the service life of the electrical installation.

Conventional connection devices have a comparatively complex structure, use a plurality of components, and are correspondingly expensive to produce. Furthermore, multiple assembly steps or disassembly steps are regularly necessary in connecting a shield conductor, which can represent a considerable amount of effort, for example given busbars having a plurality of such connection devices.

In a structural terminal known from DE 20 2015 102 037 U1, a potential collector in the form of a metallic conductor and an electrical line can be inserted into a housing. A clamping screw is arranged on the housing, via which the electrical line can be contacted with the metallic conductor in a clamping manner.

DE 10 2016 110 393 A1 describes a contacting device for contacting a shield conductor, said contacting device comprising a housing that encloses a receiving space, wherein the housing can be attached to a potential collector in such a way that the potential collector extends into the receiving space. In addition, a spring element is provided which is arranged on the housing so as to be able to pivot about a pivot axis, and can be pivoted from an open position into a clamping position. This enables a reliable and resistant contacting of a shield conductor of an electrical line with a potential collector.

SUMMARY

In an embodiment, the present invention provides a connection device for a shield conductor of an electrical line, comprising: a housing attachable to a potential collector, into which housing the electrical line with the shield conductor is insertable; a spring element which is arranged adjustably on the housing, which spring element has a clamping leg and is movable relative to the housing from an open position into a clamping position in order to, in the clamping position, act with the clamping leg on the shield conductor of the electrical line inserted in the housing; and a locking element which is adjustable, relative to the housing, between a locking position, in which the housing attached to the potential collector is locked with the potential collector, and an unlocking position for releasing the housing from the potential collector.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1A:
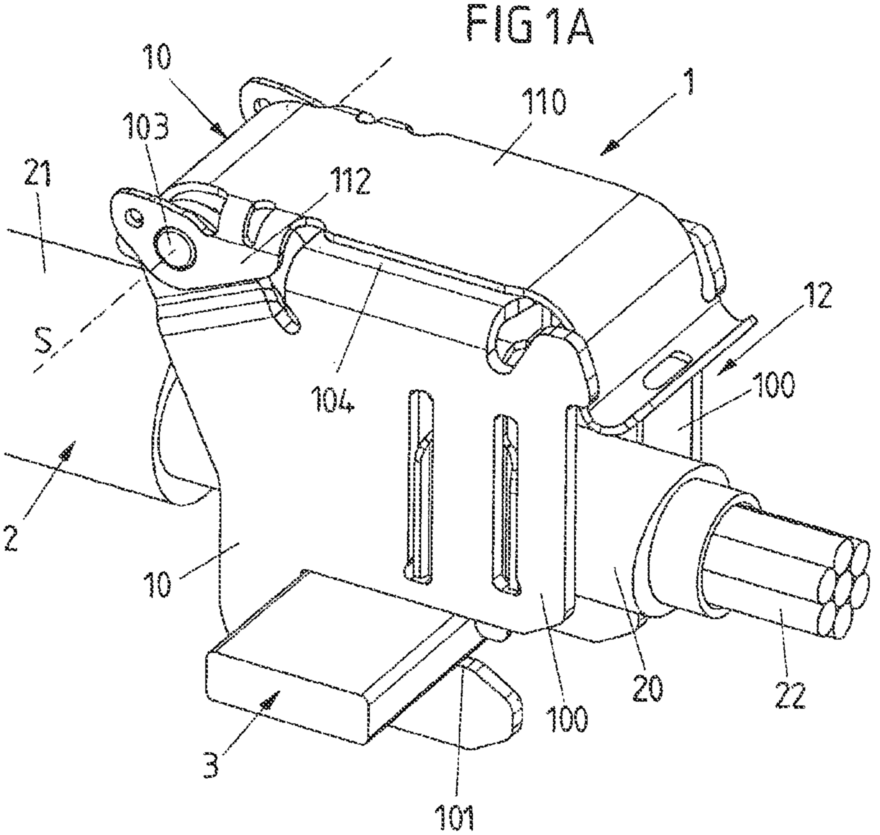
FIG. 1A is a perspective view of a connection device for electrically contacting a shield conductor of an electrical line with a potential collector, for example in the form of an electrical busbar or in the form of a housing edge of an electrical installation, wherein the connection device is shown in a state in which it is attached and locked to the potential collector, with fixedly clamped shield conductor.

In an embodiment, the present invention provides a connection device which enables an optimally secure contacting of a shield conductor of an electrical line with a potential collector (for example a busbar, a support rail, or a housing edge of an electrical installation) and is nevertheless simple to operate.

Accordingly, the connection device has a locking element which is adjustable, especially is displaceable, relative to the housing between a locking position and an unlocking position, wherein the housing attached to the potential collector is locked with the potential collector in the locking position, and in the unlocking position the housing is released for removal from the potential collector.

Accordingly, the connection device has a locking element with which the connection device can be locked to the potential collector in a simple manner, so that the connection device is held captive, especially is held positively, on the potential collector. For example, it is therefore not necessary to fix the connection device to the potential collector by means of fastening elements such as screws. The connection device can thereby be securely fixed to the potential collector even though operation is simple.

The spring element is arranged so as to be adjustable, especially pivotable, on the housing, and can be contacted, by means of the clamping leg, with a shield conductor of an electrical line, said shield conductor being inserted into a receiving space of the connection device. The spring element can, for example, be produced from a spring steel and can be inherently elastic, so that a clamping contact between the shield conductor and the potential collector can be produced and, for example, an aging-related change in the shape of the shield conductor or of the potential collector can be compensated for without the contact between the shield conductor and the potential collector being impaired.

In order to hereby enable an advantageous contacting of the clamping leg against the shield conductor (which can have a cylindrical basic shape, corresponding especially to the shaping of the electrical line), especially for an EMC-compatible large-area contacting, the clamping leg can have a contact portion via which the clamping leg can be brought into (planar) contact with the shield conductor, and which is adapted in its shape with respect to the shield conductor. Thus, the contact portion forms a curved or angled contact contour (viewed in a plane perpendicular to a longitudinal axis along which the shield conductor can be inserted into the receiving space of the housing of the connection device), so that the contact portion, when viewed in the circumferential direction about the longitudinal axis, can rest flat against the shield conductor, at least in portions. An advantageous application of force with advantageous, flat contact with the shield conductor is hereby enabled. In addition, the secure seating of the shield conductor in the housing of the connection device can be improved, because the shield conductor is also held in position within the housing via the contact contour in the plane extending perpendicular to the longitudinal axis of the line, and thus cannot be displaced transverse to the longitudinal axis (tangential to the potential collector) relative to the clamping leg.

The spring element is integrally formed, for example. Alternatively or additionally, the housing can be integrally formed. For example, the housing and/or the spring element can respectively be executed as stamped bent parts.

Recesses for receiving the potential collector can be formed on the housing. Side walls of the housing can especially have the recesses. The recesses can be adapted in their shape to the shape of the potential collector, and thus accommodate the potential collector, for example a metallic conductor which is rectangular in cross section, especially with a precise fit. For electrically contacting the shield conductor of the electrical line with a potential collector, the electrical line with the stripped shield conductor is preferably first inserted into the housing of the connection device. Then, the housing together with the electrical line arranged thereon can be attached to the potential collector, for example a busbar serving as ground, a support rail, or a segment of a housing wall of an electrical installation, for example a switch cabinet or the like. If the housing has been attached to the potential collector, the potential collector preferably extends through the receiving space along a transverse direction along which the side walls of the housing are spaced apart from one another.

In one embodiment, it is provided that, in the locking position, the locking element locks, for example partially or completely locks, a receptacle defined by the recesses of the housing (especially of the side walls of the housing), so that the potential collector accommodated in the recesses is positively held in the recesses. In this way, a secure connection of the connection device to the potential collector is made possible given a simple design of the connection device.

The locking element is, for example, guided in at least one guide on the housing. The at least one guide can be formed on one of the side walls, especially in the form of a slot. A simple and at the same time robust design is thus possible. Optionally, at least one guide slot for the locking element, especially a respective pair of guide slots, is formed at each of the two side walls. A precise guidance can hereby be provided. The locking element can be pretensioned against the guide slots so that its position on the housing is held non-positively, and the locking element does not move inadvertently relative to the housing or rattle as a result of vibrations.

The housing can be attached to the potential collector in an attachment direction. It can be provided that the locking element is displaceable relative to the housing in a displacement direction perpendicular to the attachment direction. A pull on the electrical line therefore does not cause an unintentional displacement of the locking element. The side walls of the housing can be spaced apart from one another in a transverse direction which is oriented perpendicular to the attachment direction and perpendicular to the displacement direction.

In one embodiment, the spring element is mounted on the housing so as to be pivotable about a pivot axis. For the pivotable mounting, two opposing hinge plates can be formed on the spring element, which plates project from the spring element and are, for example, engaged with pivot pins arranged on the housing, so that the spring element is connected to the housing in an articulated manner. In that the spring element is pivotably mounted on the housing, the spring element can be actuated in a simple manner. By pivoting, the spring element can be adjusted in a simple manner between the open position and the clamping position, for example in order to contact the shield conductor with the potential collector attached to the housing, or in order to, in turn, release the electrical conductor from the connection device.

It can be provided that the spring element is configured to adjust the locking element relative to the housing. For example, at least one position and/or movement of the spring element relative to the housing determines at least one position and/or movement of the locking element relative to the housing. This enables an especially simple operation of the connection device.

Optionally, the clamping leg is designed so that it pushes the locking element into the unlocking position if the spring element is moved from the clamping position into the open position. With this embodiment, it is possible, using only one actuation process, both to raise the clamping leg from the shield conductor and to cancel the locking of the housing at the potential collector, which allows an especially simple operation. Despite the provision of a locking on the potential collector, the connection device can thus be removed from the potential collector in one working step.

In a development, it is provided that one end of the clamping leg is first lifted from a shield conductor of an electrical line that is inserted into the receiving space, and then acts on an actuating segment of the locking element if the spring element is transferred from the clamping position into the open position. It is hereby achieved that the electrical line is first released so that it can be removed, but the connection device thereby continues to be held on the potential collector. Only if the opening movement is continued is the locking element also unlocked, and the connection device can be separated from the potential collector. This enables comfortable and safe operation with a reduced risk of one of the parts accidentally falling off.

The spring element can, for example, have an actuating leg which is pivotably mounted on the housing, which actuating leg is connected to the clamping leg that can be brought into contact with the shield conductor of the electrical line inserted into the receiving space in a clamping manner, and is bent toward said clamping leg. The actuating leg can be latchable to the housing in order to fix the position of the spring element relative to the housing in the clamping position. Via the actuating leg, a user can, for example, act on the spring element manually or with a tool and press the spring element in the direction of its clamping position, for example, in order to electrically contact the shield conductor with the potential collector. The spring element hereby comes into contact with the shield conductor via the clamping leg, so that the shield conductor is pressed against the potential collector to contact it, and an electrical contact between the shield conductor and the potential collector is thereby produced.

Optionally, the actuating leg is designed so that it pushes the locking element into the locking position if the spring element is moved from the open position into the clamping position. This enables a clamping of the shield conductor and a locking of the locking element in just one working step. The locking element is thereby secured in the locked position by the actuating segment of the spring element if the spring element is arranged in the clamping position.

In the clamping position, a latching of the spring element to the housing preferably takes place via the actuating leg. For this purpose, the actuating leg preferably has a latching device which, for example, can be formed by latching projections on an end portion of the actuating leg which is remote from the clamping leg. Via the latching projections, the actuating leg latches, for example, with latching projections on the housing, so that the actuating leg is positively secured in its clamping position and is thus held in the clamping position. An accidental opening of the spring element is hereby prevented.

To close the connection device, the spring element is pressed in the direction of the clamping position, for example by pressure on the actuating leg. In the clamping position, the spring element clamps the shield conductor of the electrical line to the potential collector attached to the housing, so that the shield conductor is electrically contacted with the potential collector. The spring element can be released from the closed position, for example in that a user engages with a tool, for example a screwdriver, in a tool engagement on the end segment of the actuating leg, and in this way releases the latching between the latching projections of the actuating leg and the latching projections of the housing. Given a released latching, the spring element springs out of the clamping position due to the elastic pretensioning of the clamping leg (caused by the contact against the shield conductor of the electrical line), so that the connection device is opened and the electrical line can be removed from the housing. Via a further movement of the spring element up to the end position of the open position, the locking element is also unlocked and the housing can be removed from the potential collector. However, it is also conceivable and possible to manually open the spring element without using a tool.

The housing can be integrally formed, for example. In one embodiment, the housing can, for example, have two side walls that extend parallel to one another and are spaced apart from one another along a transverse direction, between which walls the receiving space is formed, and a connecting segment connecting the side walls to one another. For example, at least one respective guide for the locking element is thereby provided on each of the side walls. The housing can thus, for example, have the form with a U-shaped cross section into which the electrical line with stripped shield conductor can be inserted.

In the connected state, the electrical line and the potential collector extend along different directions relative to the housing. While the electrical line is laid along a longitudinal axis through the housing, the potential collector extends transverse to the electrical line, through the receiving space, along the transverse direction. The housing can accordingly be attached to the potential collector such that the potential collector extends through the receiving space along the transverse direction. The shield conductor can, for example, be inserted into the housing in such a way that the shield conductor, in the clamping position, extends through the receiving space along a longitudinal axis between the side walls. The shield conductor can hereby be inserted into the receiving space, for example in an insertion direction transverse to the longitudinal axis and transverse to the transverse direction along which the side walls are spaced apart from one another, before the housing is attached to the potential collector. The electrical line thus does not necessarily need to be threaded through the housing, but rather can alternatively be inserted into the housing in a simple manner along the insertion direction, so that the shield conductor comes to rest in the receiving space of the housing.

In the clamping position, the spring element preferably comes to rest on one side and the potential collector on another side of the (stripped) shield conductor of the electrical line. The shield conductor is thus received between the spring element and the potential collector and is pressed, via clamping contact of the spring element against the shield conductor, into direct, electrically contacting contact with the potential collector.

According to one aspect, an assembly is provided, with an electrical line having a shield conductor, a potential collector, and a connection device according to any of the embodiments described herein.

The potential collector can thereby especially be a component of a support rail or of a busbar.

According to one aspect, a housing is provided for a connection device for a shield conductor of an electrical line, especially for the connection device according to any embodiment described herein. The housing can be attached to a potential collector, and the electrical line with the shield conductor can be inserted into the housing. The housing thereby has at least one bearing point for the adjustable mounting of a spring element on the housing and at least one guide. The at least one guide is designed such that, along the at least one guide, a locking element is adjustable, relative to the housing, between a locking position, in which the housing attached to the potential collector is locked to the potential collector, and an unlocking position for releasing the housing from the potential collector.

FIG. 1 shows, in a schematic view, a connection device 1 which serves for electrically contacting a shield conductor 20 in the form of an electrically conductive braided shield (or an electrically conductive shielding foil) of an electrical line 2.

The electrical line 2 has, for example, a plurality of electrical cable wires 22 which are surrounded by the shield conductor 20, for example in the form of the braided shield (and which can optionally be electrically insulated with respect to or connected to one another). The shield conductor 20 is hereby sheathed with respect to the outside by means of an electrically insulating sheath 21, so that the shield conductor 20 is electrically insulated from the outside wherever it is not stripped.

By means of the connection device 1, the shield conductor 20 of the electrical line 2 can be electrically contacted with a potential collector 3 in the form of a metallic conductor, for example a busbar, a support rail, or a housing wall of an electrical installation. The shield conductor 20 can hereby be connected, for example, to a ground potential of the potential collector 3, so that a grounding of the shield conductor 20 is provided via the connection device 1.

In principle, a plurality of electrical lines 2 can be arranged at the potential collector 3 and be electrically grounded, especially via a plurality of connection devices 1 according to FIG. 1A.

In the shown exemplary embodiment, the connection device 1 has, as can be seen from the views according to FIGS. 1 to 7B, a housing 10 which is formed from two parallel side walls 100, spaced apart from one another along a transverse direction, and a connecting segment 104 connecting the side walls 100 to one another. The housing 10 is preferably manufactured as an integral design, for example as a stamped bent part from a metal sheet.

A spring element 11, which has an actuating leg 110 and a clamping leg 111 bent toward the actuating leg 110, is arranged on the housing 10 so as to be pivotable relative to the housing 10 about a pivot axis S. The spring element 11 is, for example, produced as a stamped bent part from a spring steel and inherently elastically, so that the actuating leg 110 and the clamping leg 111 can be elastically adjustable relative to one another in their respective positioning.

Figure 1B:
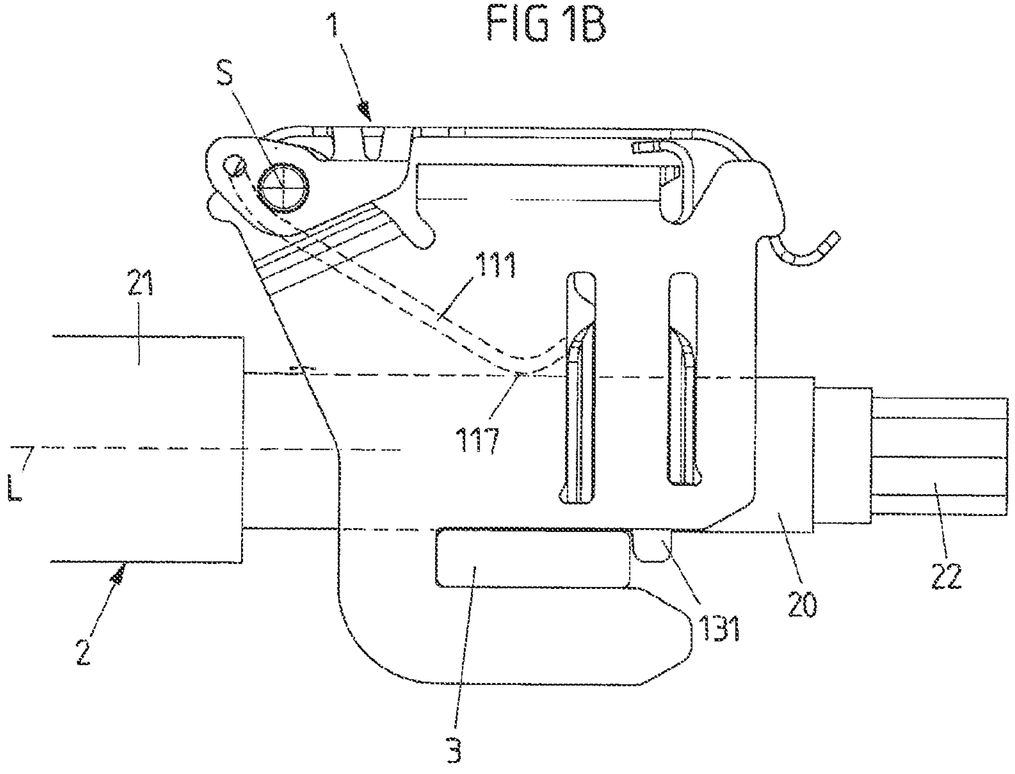
FIG. 1B is a side view of the connection device.

FIGS. 1A and 1B show the spring element 11 in a clamping position in which the spring element 11, via the clamping leg 111, is in clamping contact with the shield conductor 20 of the electrical line 2, which shield conductor 20 is stripped in portions, and presses the shield conductor 20 into electrically contacting contact with the potential collector 3 extending through the housing 10. In this clamping position, the spring element 11 is latched via latching projections 114 to an end segment 113 of the actuating leg 110 with latching projections 102 on the opposing side walls 100, which end segment is remote from the clamping leg 111, so that the spring element 11 is positively held in its clamping position relative to the housing 10.

In this clamping position, a contact portion 117 of the clamping leg 111 rests against the shield conductor 20 of the electrical line 2. In the region of this contact portion 117, the clamping leg 111 (in the plane perpendicular to the pivot axis S) is curved so that no sharp-edged regions of the clamping leg 111 (especially not its end edge remote from the pivot axis S) rest against the shield conductor 20, and thus a planar contact of the clamping leg 111 against the shield conductor 20 is provided.

In the clamping position, the spring leg 111 is tensioned elastically relative to the actuating leg 110 in that the spring element 11 is pressed into the clamping position, and in this clamping position is latched to the housing 10 via the actuating leg 110. Due to the elasticity of the spring element 11, an (aging-related) weakening of the shield conductor 20 of the electric line 2 can be compensated for, for example, without the electrical contacting of the shield conductor 20 with the potential collector 3 being impaired by the weakening.

On the actuating leg 110, the spring element 11 has two opposing hinge plates 112 that are respectively connected in an articulated manner to one of the side walls 100 of the housing 10, and for this purpose are arranged in an articulated manner at pivot pins 103 of the side walls 100. The spring element 11 is thus pivotable about the pivot pins 103 and can especially be adjusted between an open position, in which the spring element 11 is opened from the clamping position against a closing direction Z (see, for example, FIG. 2A), and the clamping position (see, for example, FIG. 1A).

Figure 2A:
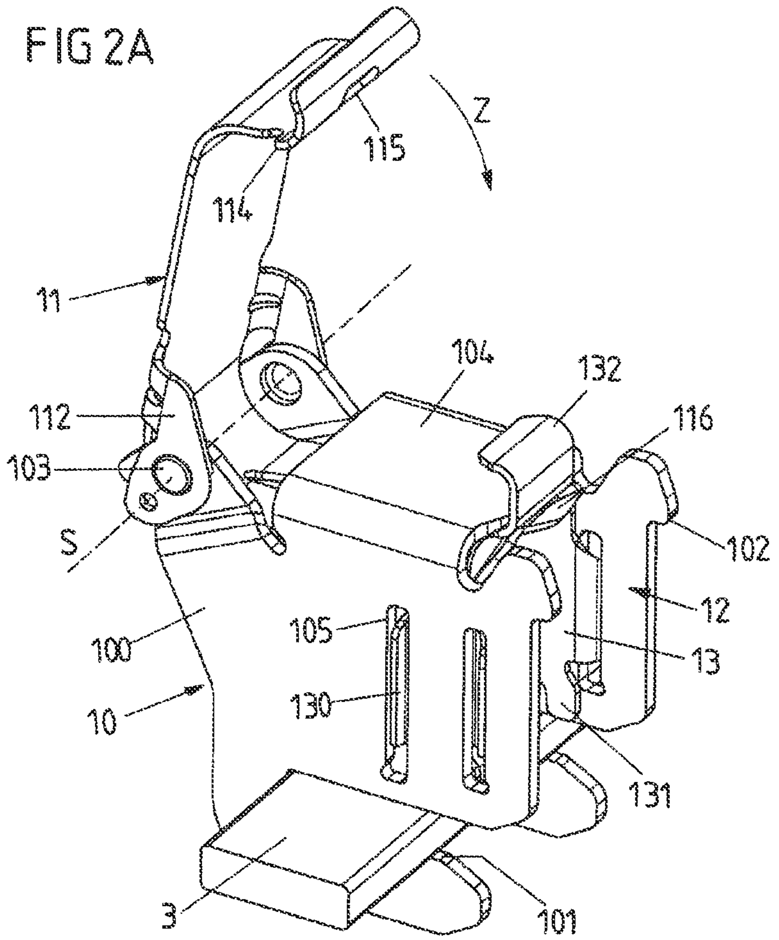
FIG. 2A is a perspective view of the connection device on the potential collector without an electrical line, in an open and unlocked state.
Figure 2B:
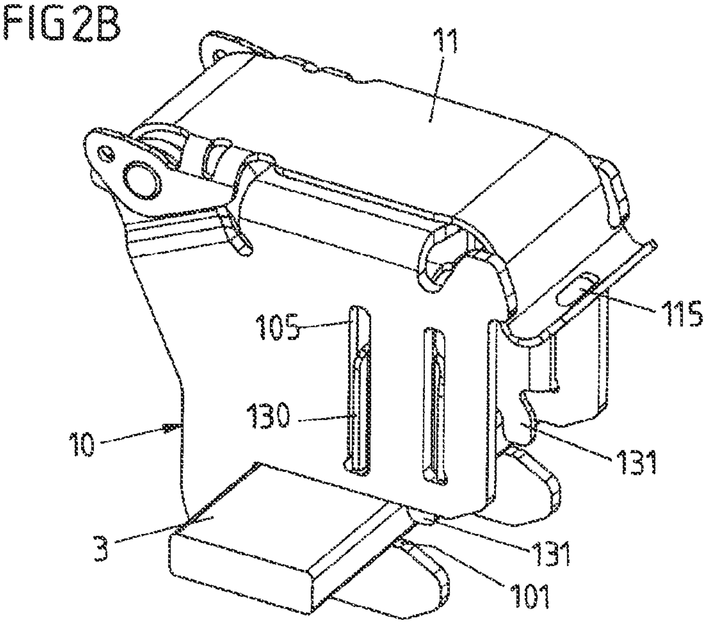
FIG. 2B shows the connection device according to FIG. 2A, but in a state in which it is closed and locked to the potential collector.
Figure 3:
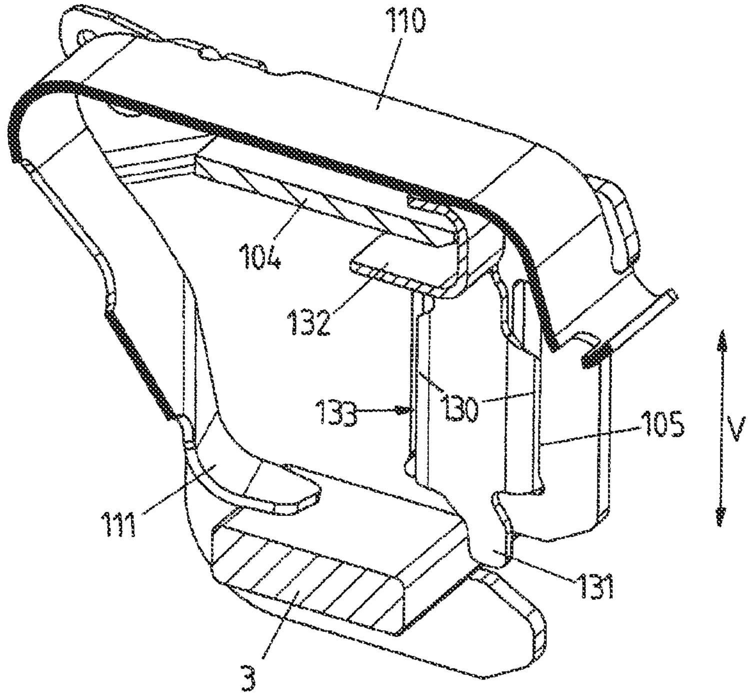
FIG. 3 is a perspective sectional view of the connection device according to FIG. 2B.
Figure 4A:
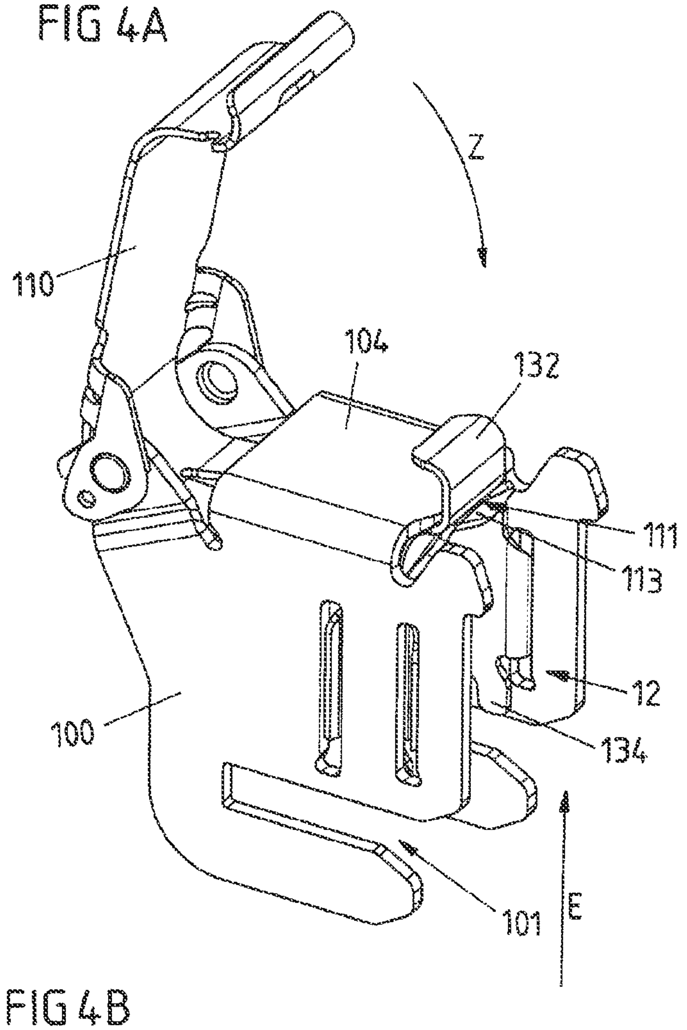
FIG. 4A is a perspective view of the connection device without potential collector and without electrical line, in an open and unlocked state.
Figure 4B:
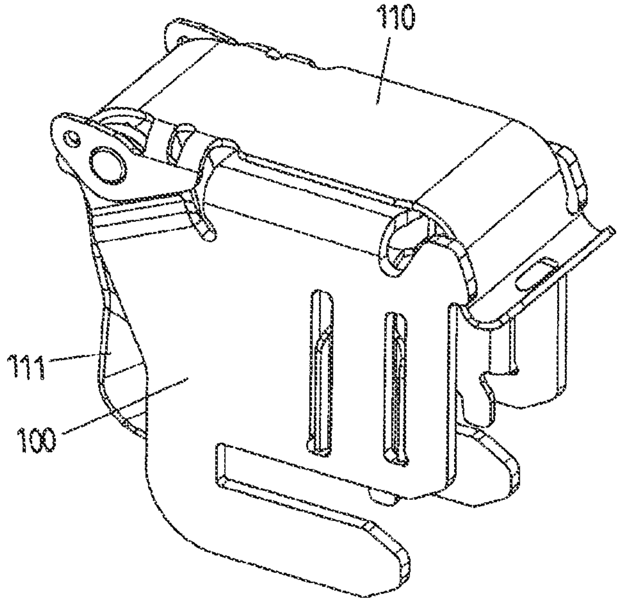
FIG. 4B shows the connection device according to FIG. 4A, but in a closed and locked state.

Recesses 101 situated opposite one another are formed on the side walls 100 of the housing 10, in which recesses the potential collector 3 can be accommodated in such a way that the potential collector 3, in a position placed against the housing 10, extends along the transverse direction through a receiving space 12 of the housing 10 that is formed between the side walls 100, for example as can be seen from FIGS. 1A and 2A.

Each of the recesses 101 is formed in the shape of a slot in the respective housing wall 100. The slots run parallel to one another.

In contrast, the electrical line 2 can be inserted into the receiving space 12 with the shield conductor 20, which is stripped in segments, in an insertion direction E (see, for example, FIG. 4A), from a side facing away from the connection segment 104 of the housing 10, so that the electrical line 2 in the inserted position extends along a longitudinal axis L (see especially FIG. 1A), transverse to the transverse direction and transverse to the insertion direction E, through the receiving space 12 of the housing 10.

For electrically contacting the shield conductor 20 of the electric line 2 with the potential collector 3, the electrical line 2, with the shield conductor 20 stripped in portions, is first inserted into the receiving space 12 in the insertion direction E (alternatively perpendicular to the insertion direction E and to the transverse direction, or perpendicular to the transverse direction and oblique to the insertion direction E). The spring element 11 is hereby usually located in its open position (see, for example, FIG. 4A), from which the spring element 11 can be moved along the closing direction Z into the clamping position.

Then, the connection device 1 together with the electrical line 2 arranged thereon is attached to the potential collector 3 by bringing the housing 10 into engagement with the potential collector 3 via the recesses 101. The potential collector 3 thus extends through the receiving space 12 of the housing 10 such that the spring element 11 and the potential collector 3 come to rest against different sides of the electrical line 2.

Alternatively, the housing 10 can first be pushed onto the potential collector 3, and then the electrical line 2 can be inserted into the receiving space 12 between the spring element 11 and the grounding element 3.

Now, via pressure on the actuating leg 110, the spring element 11 is transferred into the clamping position shown especially in FIGS. 1A, 1B, 2B, and 3, and for this purpose is pressed in the closing direction Z until the actuating leg 110 latches with the latching projections 102 on the side walls 100 of the housing 10 via its latching projections 114 arranged on the end segment 113. In this way, the spring leg 111 comes into clamping contact with the shield conductor 20 and is elastically braced so that the shield conductor 20 is pressed with sufficient contact force into contacting contact with the potential collector 3.

If the electrical line 2 is to be removed from the potential collector 3, a user can engage with a suitable tool, for example a screwdriver, in a tool engagement 115 in the form of an opening on the end segment 113 of the actuating leg 110, in order to thereby release the latching of the actuating leg 110 with the housing 10 via (elastic) bending of the (presently bent) end segment 113. Due to the pretensioning of the spring leg 111, the spring element 11 then springs out of its clamping position, so that the connection device 1 is opened.

In order to prevent the connection device 1 from unintentionally releasing from the potential collector 3, the connection device 1 further comprises a locking device having a locking element 13 adjustably mounted on the housing 10.

The locking element 13 is displaceable relative to the housing 10 between a locking position, in which the housing 10 attached to the potential collector 3 is locked to the potential collector 3, and an unlocking position for releasing the housing 10 from the potential collector 3.

The locking element 13 is integrally formed, in the present instance as a stamped bent part from a metal sheet. The locking element 13 is generally U-shaped. It has two side parts 133 which respectively extend parallel to the housing walls 100. The side parts 133 form the legs of the U-shape. Each of the side parts 133 has at least one sliding segment, here two sliding segments 130. Each of the sliding segments 130 is designed in the form of a (bent) plate protruding from the respective side part 133. The sliding segments 130 respectively engage in a guide 105 of the housing 10. In the present instance, the guides 105 are respectively designed as a slot in the corresponding side wall 100 of the housing. The sliding segments 130 are shorter than the guides 105, so that they are displaceable along a displacement axis V (see especially FIG. 3) between two end lengths. The displacement axis V runs perpendicular to the transverse direction and perpendicular to the main extension direction of the recesses 101.

The sliding segments 130 engage outward, from the inside in the receiving space 12, in the guides 105. The side parts 133 of the locking element 13 are connected to one another via an actuating segment 132. The side parts 133 are thereby pretensioned outward so that the sliding segments 130 are pushed into the guides 105. Alternatively or additionally, the sliding segments 130 are pretensioned against the guides 105. The locking element 13 is (only) displaceable linearly along the guides 105 with respect to the housing 10.

The actuating segment 132 has a U-shaped cross segment (see, e.g., FIG. 3), and is arranged in such a way as to enclose part of the connecting segment 104 of the housing 10. The locking element 13 is displaceable between two end positions relative to the housing 10, namely between the locking position and the unlocking position.

A projection 131 projects from each of the side parts 133 (in the direction of the displacement axis V). In the locking position of the locking element 13 In the locking position, the projections 131 block a removal of the potential collector 3 from the recesses 101 in the direction of the main extension axis of the recesses 101. The projections 131 respectively serve as bars. The recesses 101 surround the potential collector 3 on three sides, and the projections 131 extend in the locking position along a fourth side of the potential collector 3. Thus, the potential collector 3 cannot be removed from the recesses 101 in any direction perpendicular to its main extension axis if the locking element 13 is arranged in the locking position; see, for example, FIGS. 1A, 1B, 2B, 3, 4B, and 6A-7B.

Figure 5A:
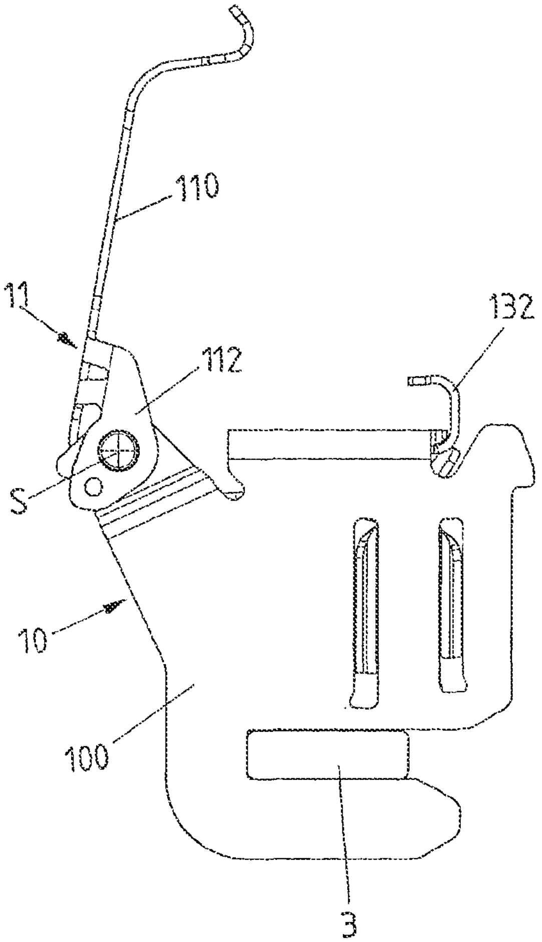
FIG. 5A is a side view of the connection device according to FIG. 2A.
Figure 5B:
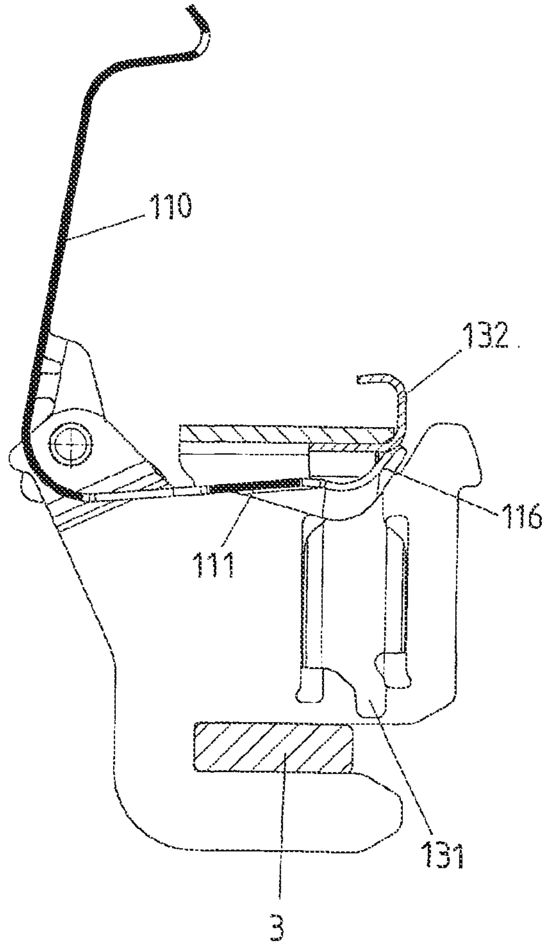
FIG. 5B is a sectional view of the connection device according to FIG. 2A.
Figure 6A:
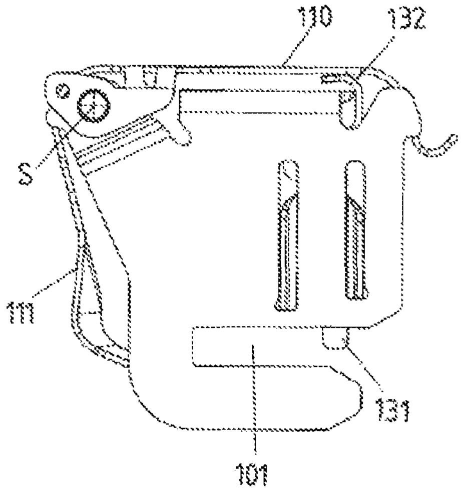
FIG. 6A is a side view of the connection device according to FIG. 4B.
Figure 6B:
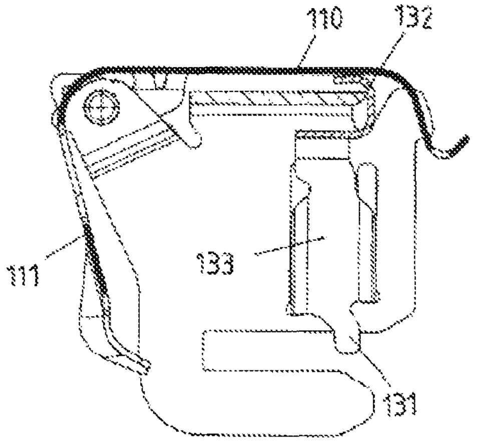
FIG. 6B is a sectional view of the connection device according to FIG. 4B.
Figure 7A:
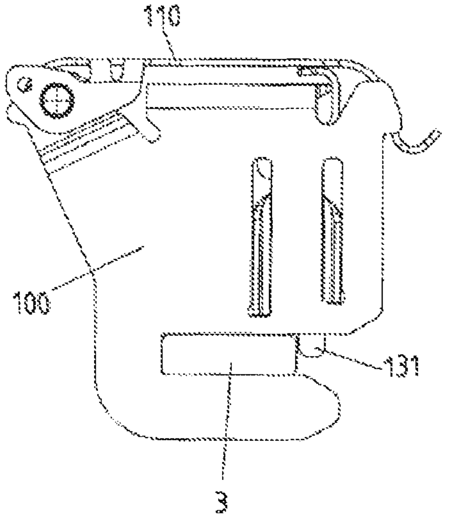
FIG. 7A is a side view of the connection device according to FIG. 2B.
Figure 7B:
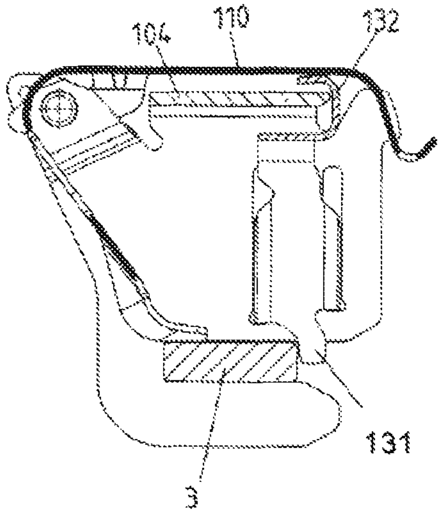
FIG. 7B is a sectional view of the connection device according to FIG. 2B.

As can be seen especially using FIGS. 5B, 6B, and 7B, the locking element 13 is displaceable relative to the housing 10 due to a relative movement of the spring element 11 to the housing 10. For this purpose, the actuating segment 132 of the locking element 13 is arranged and designed such that the actuating leg 110 and the clamping leg 111 of the spring element 11 can act thereon.

If the spring element 11 is pivoted, relative to the housing 10, from the open position into the clamping position, the actuating leg 110 then comes into contact with the actuating segment 132 of the locking element 13 shortly before reaching its end position that is latched to the housing 10. Given a further movement of the spring element 11 toward the latched end position, the actuating leg 110 pushes the actuating segment 132, and thus the locking element 13, in the direction of the receptacle for the potential collector 3 that is defined by the recesses 101 of the housing 10. The locking element 13 is hereby displaced into its locking position. If the actuating leg 110 is located in its latched end position, the actuating leg 110 secures the locking element 13 in the locking position; see, for example, FIG. 6A-7B.

If the actuating leg 110 is released from the latch manually or by means of a tool and is moved into the open position (manually, by means of a tool, and/or as a result of the spring-elastic pretensioning of the spring element 11 in the clamping position), then the actuating leg 110 of the spring element 11 moves away from the actuating segment 132 of the locking element 13, and thus allows a movement thereof along the guides 105. However, as a result of the pretensioning of the locking element 13 against the housing 10, said locking element is still held in a frictionally engaged manner against the housing 10 and remains in the locking position without additional application of force. The connection device 1 hereby remains securely held on the potential collector 3 even after the actuation leg 110 has been opened.

If the spring element 11 is opened further against the closing direction Z, a different region of the spring element 11 arrives into contact with the locking element 13 than is so in the clamping position. In the present instance, the clamping leg 111 is first lifted off the shield conductor 20 of the line 2 and then acts on the actuating segment 132 of the locking element 13. The clamping leg 111 thereby contacts the actuating segment 132 of the locking element 13 on one side, which is situated opposite the side of the actuating element 132 on which the actuating leg 110 acts in the clamping position of the spring element 11. In other words, the actuating leg 110 presses against the actuating segment 132 from above on the way into the clamping position, whereas the clamping leg 111 presses against the actuating segment 132 from below on the way into the open position. It is hereby achieved that the locking element 13 is unlocked only shortly before the spring element 11 reaches the completely open position, so that the connection device 1 can be removed from the potential collector 3.

Given the connection device 1, an additional component in the form of the locking element 13 is thus provided that ensures a secure seating on the potential collector 3.

Insofar as the spring element 11 is not arranged in the latched clamping position, the locking element 13 can optionally also be displaced manually on the housing 10 between the locking position and the unlocking position. For this purpose, the actuating segment 132 can, for example, be pushed or pulled in a simple manner. This allows, for example, a preliminary fixing of the connection device to the potential collector 3.

Optionally, a bevel shown in Figures acts on the potential collector 3 at each of the projections 131 in the locking position in order to also hold said collector non-positively, in addition to positively, for example in order to prevent a lateral displacement of the potential collector 3 relative to the connection device 1.

The idea underlying the invention is not limited to the exemplary embodiments described above, but can also be realized in a completely different manner.

The provided connection device can have a simple design and use only a few components. The connection device can basically be produced especially by a housing part, a spring element, and a locking element. Further components can be omitted. A simple, cost-effective manufacture with a compact design is the result.

The connection device can additionally provide an advantageous, reliable, durable contact force for electrically contacting a shield conductor with a potential collector, and at the same time produce a secure locking with the potential collector. The connection device can be simple and intuitive to operate, and also enable a release of a contact.

The connection device can in principle also be designed differently than is described here. For example, the housing can have a different shape.

The housing can preferably be produced from a metal, for example as a stamped bent part. However, this is not absolutely necessary. In principle, it is also conceivable and possible to form the housing out of plastic.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Connecting device
10 Housing
100 Side walls
101 Recess
102 Latching projection
103 Pivot pin (bearing point)
104 Connecting section
105 Guide
11 Spring element
110 Actuating leg
111 Clamping leg
112 Hinge plate
113 End section
114 Latching projection
115 Tool engagement
117 Contact segment
12 Receiving space
13 Locking element
130 Sliding segment
131 Projection
132 Actuating section
133 Side segment
2 Line
20 Braided shield (shield conductor)
21 Sheath
22 Cable wires
3 Potential collector
E Insertion direction
L Longitudinal axis
S Pivot axis
V Displacement axis
Z Closing direction

The invention claimed is:

1. A connection device for a shield conductor of an electrical line, comprising:

a housing attachable to a potential collector, into which housing the electrical line with the shield conductor is insertable;

a spring element which is arranged adjustably on the housing, which spring element has a clamping leg and is movable relative to the housing from an open position into a clamping position in order to, in the clamping position, act with the clamping leg on the shield conductor of the electrical line inserted in the housing; and a locking element which is adjustable, relative to the housing, between a locking position, in which the housing attached to the potential collector is locked with the potential collector, and an unlocking position for releasing the housing from the potential collector, wherein the spring element is configured to adjust the locking element relative to the housing.

2. The connection device of claim 1, wherein recesses configured to receive the potential collector are formed on the housing.

3. The connection device of claim 2, wherein the locking element in the locking position is configured to lock a receptacle defined by the recesses of the housing.

4. The connection device of claim 1, wherein the locking element is guidable in at least one guide on the housing.

5. The connection device of claim 4, wherein the housing has two parallel side walls extending in parallel to and spaced apart from one another along a transverse direction, between which a receiving space is formed, and a connecting segment connecting the side walls to one another, and wherein at least one guide is provided on each of the sidewalls.

6. The connection device of claim 1, wherein the housing is attachable to the potential collector in an attachment direction, and wherein the locking element is displaceable relative to the housing in a displacement direction perpendicular to the attachment direction.

7. The connection device of claim 1, wherein the spring element is pivotable relative to the housing about a pivot axis.

8. The connection device of claim 1, wherein the clamping leg is configured so as to push the locking element into the unlocking position when the spring element is moved from the clamping position into the open position.

9. The connection device of claim 8, wherein the clamping leg is configured to be first lifted from an inserted shield conductor, and then to act on an actuating segment of the locking element, if the spring element is moved from the clamping position into the open position.

10. The connection device of claim 1, wherein the spring element comprises an actuating leg arranged pivotably on the housing, which actuating leg is bent toward the clamping leg, and wherein the actuating leg is configured to press the locking element into the locking position if the spring element is moved from the open position into the clamping position.

11. The connection device of claim 1, wherein the connection device is configured to receive the shield conductor of the electrical line in the clamping position between the spring element and the potential collector.

12. An assembly, comprising;

an electrical line comprising a shield conductor;

a potential collector; and the connection device of claim 1.

13. The assembly of claim 12, wherein the potential collector comprises a component of a support rail or of a busbar.

14. The connection device of claim 1, wherein the housing has at least one bearing point for adjustable mounting of a spring element on the housing and at least one guide, and wherein the at least one guide is configured such that a locking element is adjustable relative to the housing along the at least one guide, between a locking position, in which the housing attached to the potential collector is locked to the potential collector, and an unlocking position for releasing the housing from the potential collector.

15. A connection device for a shield conductor of an electrical line, comprising:

a housing attachable to a potential collector, into which housing the electrical line with the shield conductor is insertable;

a spring element which is arranged adjustably on the housing, which spring element has a clamping leg and is movable relative to the housing from an open position into a clamping position in order to, in the clamping position, act with the clamping leg on the shield conductor of the electrical line inserted in the housing; and a locking element which is adjustable, relative to the housing, between a locking position, in which the housing attached to the potential collector is locked with the potential collector, and an unlocking position for releasing the housing from the potential collector, wherein the clamping leg is configured so as to push the locking element into the unlocking position when the spring element is moved from the clamping position into the open position.

16. The connection device of claim 15, wherein the clamping leg is configured to be first lifted from an inserted shield conductor, and then to act on an actuating segment of the locking element, if the spring element is moved from the clamping position into the open position.

17. A connection device for a shield conductor of an electrical line, comprising:

a housing attachable to a potential collector, into which housing the electrical line with the shield conductor is insertable;

a spring element which is arranged adjustably on the housing, which spring element has a clamping leg and is movable relative to the housing from an open position into a clamping position in order to, in the clamping position, act with the clamping leg on the shield conductor of the electrical line inserted in the housing; and a locking element which is adjustable, relative to the housing, between a locking position, in which the housing attached to the potential collector is locked with the potential collector, and an unlocking position for releasing the housing from the potential collector, wherein the spring element comprises an actuating leg arranged pivotably on the housing, which actuating leg is bent toward the clamping leg, and wherein the actuating leg is configured to press the locking element into the locking position if the spring element is moved from the open position into the clamping position.

* * * * *